United States Patent [19]

Wan et al.

[11] Patent Number: 5,625,378

[45] Date of Patent: Apr. 29, 1997

[54] METHOD AND APPARATUS FOR CONVEX INTERPOLATION FOR COLOR CALIBRATION

[75] Inventors: Shijie J. Wan, Rochester; Rodney L. Miller, Fairport; James R. Sullivan, Spencerport, all of N.Y.

[73] Assignee: Eastman Kodak Company, Rochester, N.Y.

[21] Appl. No.: 68,823

[22] Filed: May 28, 1993

[51] Int. Cl.$^6$ .................................................. G09G 5/02
[52] U.S. Cl. .......................................... 345/150; 345/154
[58] Field of Search .................................. 345/150, 151, 345/152, 153, 154, 155, 186, 187, 188, 199; 382/17, 44, 45, 162, 167, 276, 277; 395/101, 131

[56] References Cited

U.S. PATENT DOCUMENTS

| | | |
|---|---|---|
| 4,386,411 | 5/1983 | Risk et al. . |
| 4,462,083 | 7/1984 | Schwefel . |
| 4,500,919 | 2/1985 | Schreiber . |
| 4,534,059 | 8/1985 | Yamada . |
| 4,763,283 | 8/1988 | Coutrot . |
| 4,813,000 | 3/1989 | Wyman et al. . |
| 4,818,979 | 4/1989 | Manson . |
| 4,875,032 | 10/1989 | McManus et al. . |
| 4,901,258 | 2/1990 | Akiyama . |
| 5,003,299 | 3/1991 | Batson et al. . |
| 5,018,085 | 5/1991 | Smith, Jr. . |
| 5,025,400 | 6/1991 | Cook et al. . |
| 5,038,300 | 8/1991 | Seiler et al. . |
| 5,087,126 | 2/1992 | Pochieh . |
| 5,157,506 | 10/1992 | Hannah . |
| 5,268,753 | 12/1993 | Yamaguchi ............................ 358/527 |
| 5,268,754 | 12/1993 | Van de Capelle et al. ............... 382/17 |

FOREIGN PATENT DOCUMENTS

| | | |
|---|---|---|
| 0403081 | 12/1990 | European Pat. Off. . |
| 0488656 | 3/1992 | European Pat. Off. ......... H04N 1/46 |
| 4101566 | 4/1992 | Japan ............................... H04N 1/40 |
| 1439534 | 11/1988 | U.S.S.R. . |
| 2155738 | 9/1985 | United Kingdom . |

OTHER PUBLICATIONS

Stone, et al. ACM Transactions On Graphics, vol. 7, No. 4, Oct., 1988, "Color Gamut Mapping and the Printing of Digital Color Images", pp. 249–292.

Lawrence F. Shampine and Richard C. Allen, Jr., "Numerical Computing: an introduction", 1973, pp. 147–16 and 252–255.

Michael Kallay, "Convex Hull Made Easy", 1986, p. 161, *Information Processing Letters 22*.

Katsuhiro Kanamori and Hiroaki Kotera, "Color Correction Technique for Hard Copies by 4-Neighbors Interpolation Method", *Journal of Imaging Science and Technology*, vol. 36, No. 1, Jan./Feb. 1992, pp. 73–80.

Robert E. Barnhill and Wolfgang Boehm, "Surfaces In Computer Aided Geometric Design", 1992, pp. 100–107.

(List continued on next page.)

*Primary Examiner*—Richard Hjerpe
*Assistant Examiner*—Xiao M. Wu
*Attorney, Agent, or Firm*—Peyton C. Watkins

[57] ABSTRACT

A convex interpolation apparatus and method to map source color signals in a n-dimensional color space to target color signals in a m-dimensional color space includes finding a set of sample signals in the source color space whose convex hull encloses the given signal; determining the coefficients needed to express the given signal as a convex combination of the set of sample signals; and interpolating the source signal to obtain a target signal in the target color space by using the coefficients and the sample signals is the target color space that correspond to the sample signals selected in the source color space. The sample signals in both color spaces can be lattice points or non-lattice points. A method and apparatus are also provided which can not only determine if a point is enclosed by a convex hull of a set of points in a n-dimensional space, but also simultaneously derive the coefficients needed to express the given point as a convex combination of the set of points.

4 Claims, 5 Drawing Sheets

OTHER PUBLICATIONS

Katsuhiro Kanamori et al., "A Color Transformation Algorithm Using 'Prism Interpolation", *IS&T'S Eighth International Congress on Advances in Non-Impact Printing Technologies*, 1992, pp. 477–482.

Alan W. Paeth, "Algorithms For Fast Color Correction", *Proceedings of the SID*, vol. 30/3, 1989, p. 175.

R.S. Gentile et al., "A Comparison of Techniques for Color Gamut Mismatch Compensation", *Journal of Imaging Technology*, vol. 16, No. 5, Oct. 1990, pp. 176–181.

Maureen C. Stone et al., "Color Gamut Mapping and the Printing of Digital Color Images", *ACM Transactions on Graphics*, vol. 7, No. 4, Oct. 1988, pp. 249–292.

Steven R. Lay, "Convex Sets and Their Applications", pp. 16–21.

Peter Alfeld, "Scattered Data Interpolation in Three or More Variables", 1989, pp. 1–33.

Donald Shepard, "A two–dimensional interpolation function for irregularly–spaced data", pp. 517–524, 1968.

Abstract –U.S. Patent 4,992,861, Feb. 12, 1991.

Abstract –U.S. Patent 4,975,866, Dec. 4, 1990.

Abstract –U.S. Patent 4,839,722, Jun. 13, 1989.

Abstract –U.S. Patent 4,833,531, May 23, 1989.

Abstract –U.S. Patent 4,609,917, Aug. 2, 1986.

Abstract –"New Direct Color Mapping Method For Reducing The Storage Capacity of Look–Up Table Memory", H. Ikegami, *Proceedings of the SPIE—The International Society for Optical Engineering*, vo. 1075, pp. 26–31, 1989.

Abstract –"A Fast Algorithm For Color Image Quantization Using Only 256 Colors", T. Watanabe, *Systems and Computers in Japan*, vol. 19, No. 3, pp. 64–72, Mar. 1988.

Abstract –"A Color Compression Algorithm Using Linear Division of RGB Space", Y. Arai et al., *Transactions of the Institute of Electronics, Information and Communication Enigneers*, vol. J70, No. 2, pp. 346–351, Feb. 1987.

Abstract –U.S. Patent 5,053,866, Oct. 1, 1991.

Abstract –U.S. Patent 5,107,332, Apr. 21, 1992.

Abstract –U.S. Patent 4,977,521.

Abstract –U.S. Patent 4,991,120.

Abstract –U.S. Patent 5,134,573.

Abstract –U.S. Patent 4,660,156.

Abstract –Japan 1–277886.

Abstract –2–79093.

Abstract –Japan 2–146589.

Abstract –Japan 3–194593.

Abstract –Soviet Union 1538–166–A.

METHOD AND APPARATUS FOR CONVEX INTERPOLATION FOR COLOR CALIBRATION

CROSS REFERENCES TO RELATED APPLICATION

This application is related to the concurrently filed applications entitled Method And Apparatus For Mapping Between Color Spaces and Creating a Three Dimensional Inverse Lookup Table by Wan, Miller and Sullivan having Kodak Docket No. 66,915 and Method And Apparatus For Determining A Gamut Boundary And A Gamut Descriptor by Wan having Kodak Docket No. 67,464, both incorporated by reference herein.

BACKGROUND OF THE INVENTION

1. Field of the Invention

The present invention is directed to a method of converting color data from one color space or coordinate system to another color space or coordinate system using convex interpolation and, more particularly, to determining whether a color value, point or signal to be interpolated is within a convex hull of the color values, points or signals in the neighborhood of the point in a first color space and, if so, determining the interpolation weights required to obtain the corresponding target color value in the second space using the points in the second space that correspond to the surrounding points in the first space.

2. Description of the Related Art

Figure 1:
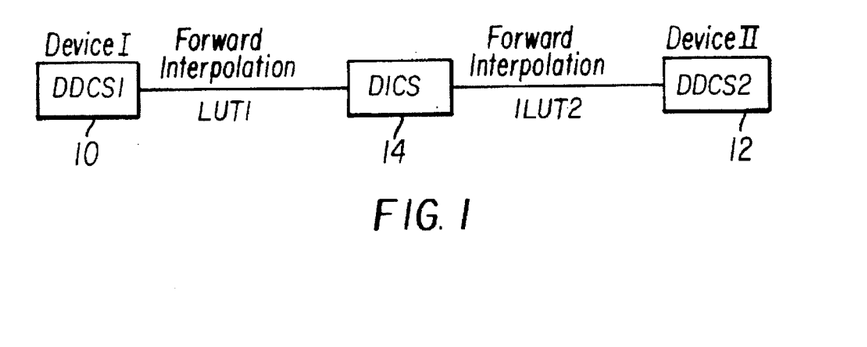
FIG. 1 illustrates a transform from a DDCS to another DDCS via a DICS using forward and backward interpolation.

Interpolation using look-up tables (LUT) is an approach used for color calibration in both transforming color signals from one color space to another color space and in creating tables used for such transformations. A basic goal in color calibration is to reproduce color images generated from one device on another device without loss or with minimum loss of color fidelity. FIG. 1 illustrates a color calibration process to reproduce a color image for device I on device II. In FIG. 1, the input image is represented in a device-dependent color space (DDCS1) 10, the output image is represented in another device-dependent color space (DDCS2) 12, the transformation between DDCS1 and DDCS2 is performed through a device-independent color space (DICS) 14.

Figure 2:
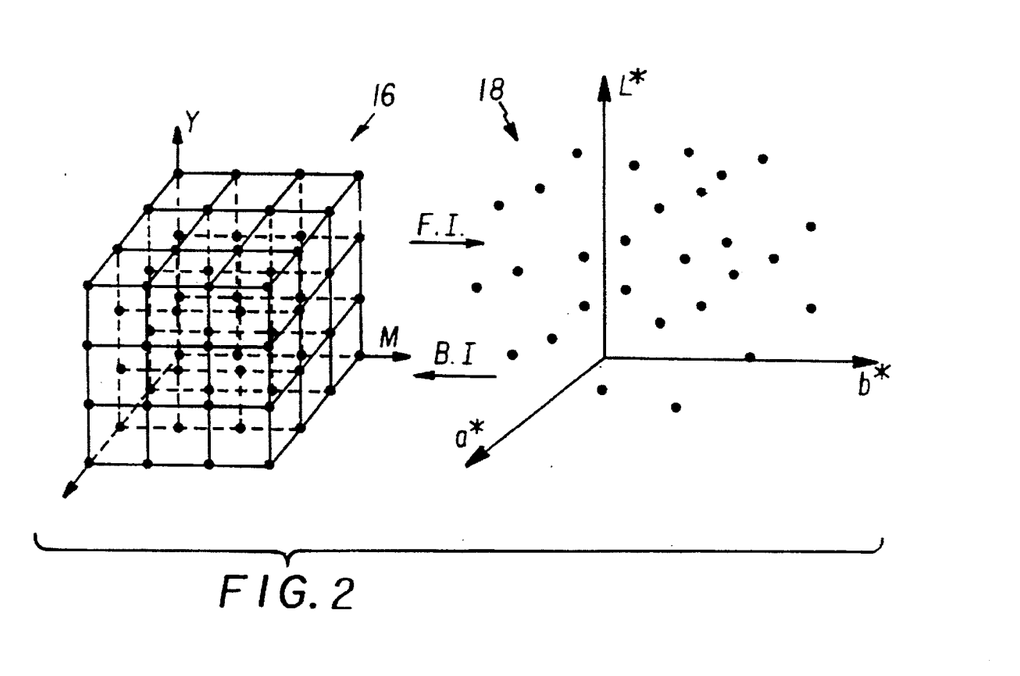
FIG. 2 depicts backward and forward interpolation.

The relationship between a DDCS and a DICS can be described by a LUT which is obtained by measuring a number of color patches generated from the specific device. For convenience, the code values of these color patches are usually chosen to be lattice points spanning the full range of the DDCS, while their corresponding points in the DICS may be spaced irregularly. An interpolation from a DDCS to a DICS is a called forward interpolation, and an interpolation from a DICS to a DDCS is called a backward interpolation as illustrated in FIG. 2.

We now consider the following general interpolation problem. Let $X=\{x_1, x_2, \ldots, x_s\}$ be a set of points in a n-dimensional vector space $R^n(s>n)$, and $Y=\{y_1, y_2, \ldots, y_s\}$ be a set of the corresponding points in a m-dimensional vector space $R^m$. The sample set of $(x_1, y_1), \ldots, (x_s, y_s)$ is called a look-up table (LUT). Given a point $x \in R^n$, we want to find its corresponding point $y \in R^m$ by interpolation based on the LUT.

Figure 3:
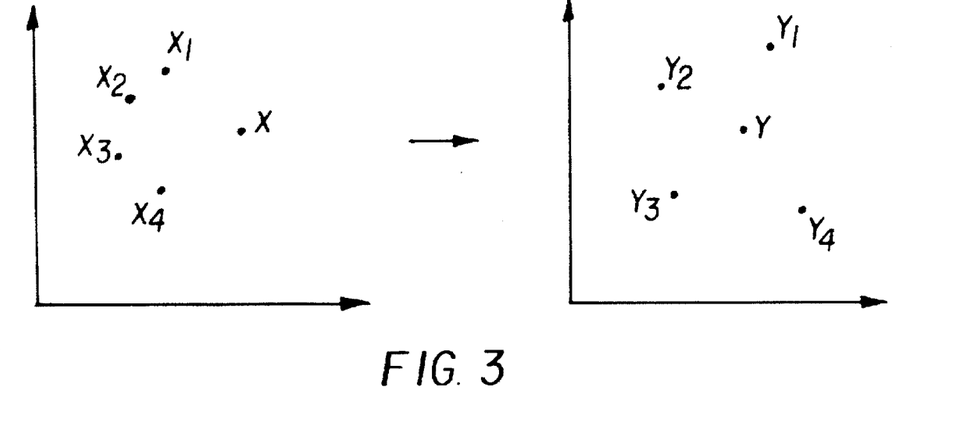
FIG. 3 illustrates a problem of distance-based sample interpolation.

Multi-dimensional interpolation is a common problem in computational geometry, computer graphics, and color calibration. Most of the existing interpolation methods are designated for the cases in which the sample points $x_1, x_2, \ldots, x_s$ are lattice points in $R^n$ and, as a result, cannot be used for backward interpolation since the points in the LUT are non-lattice points in the DICS. Among these forward interpolation schemes are the 4-point tetrahedron interpolation, the 6-point prism interpolation, and the 8-point cube interpolation, also known as the trilinear interpolation. More general interpolation methods which do not require that $x_1, x_2, \ldots, x_s$ be lattice points in $R^n$ include the vector interpolation, the distance-based interpolation and the tetrahedral interpolation. In the vector model, a linear function is used to interpolate a point $x=(z_1, z_2, z_3)^T$ (where T denotes the transpose of a vector):

$$y=f(x)=a_1z_1+a_2z_2+a_3z_3+a_4 \tag{1}$$

where the coefficients $a_1, a_2, a_3, a_4 \in R^3$ are determined so that f(x) satisfies the following boundary conditions:

$$f(x_i)=y_i, \; i=1,2,3,4, \tag{2}$$

where $x_1, x_2, x_3, x_4 \in R^3$ are the four points closest to x in X, $y_1, y_2, y_3, y_4$ are the corresponding points of $x_1, x_2, x_3, x_4$. A problem with this model is that it sometimes gives an interpolated point y which is far from all the points $y_1, y_2, y_3, y_4$. A distance-based model interpolates a point x based on the distances between x and k points $x_1, x_2, \ldots, x_k$ closest to x:

$$y=f(x)=\sum_{i=1}^{k} w_i y_i, \; x \neq x_i, \tag{3}$$

where $y_1, y_2, \ldots, y_k$ are the corresponding points of $x_1, x_2, \ldots, x_k$, and $$w_i = \frac{\|x-x_i\|^{-p}}{\sum_{i=1}^{k} \|x-x_i\|^{-p}}, \; p>1, \tag{4}$$

where $\|.\|$ denotes the Euclidean distance, p is usually set to be 2. A problem with this interpolation scheme is that when x is close to a sample point $x_i$, the weight or coefficient $w_i$ becomes dominant, resulting in a flat region in the neighborhood of $y_i$. A common problem with both the vector interpolation and the distance-based interpolation schemes is that the sample points used for interpolation are selected based on distance only. This could lead to a situation in which the interpolation formulas are used for an extrapolation problem as indicated by FIG. 3. This can happen simply because k points closest to a given point x may not necessarily surround x as illustrated in FIG. 3. Tetrahedral interpolation requires using surrounding points for the interpolation, but restricts use to only n+1 points during interpolation in an n-dimensional interpolation problem. This makes tetrahedral interpolation sensitive to noise and less robust. In addition tetrahedral interpolation requires three steps in the process. The first step is to find a tetrahedron which encloses the given point, the second step is to determine the interpolation coefficients and the third step is to interpolate. The overhead computation involved reduces the efficiency of the interpolation scheme.

What is needed is a more powerful interpolation method to map color signals between color spaces.

SUMMARY OF THE INVENTION

It is an object of the present invention to provide an interpolation method which does not require that the sample signals or points, in the two spaces between which interpolation is performed, be lattice points as in the trilinear and prism interpolations.

It is another object of the present invention to provide an interpolation method which does not require that the dimensions n and m of the two spaces be the same as does vector interpolation.

It is a further object of the present invention to provide an interpolation method that does not require that only n+1 points be used for an n-dimensional interpolation as does vector and tetrahedral interpolation.

It is also an object of the present invention to provide an interpolation method which does not select sample signals for use in the interpolation based on distance alone as do vector and distance based interpolation but rather selects sample signals based on both distance and the concept of a convex hull.

It is still a further object of the present invention to provide an interpolation method that does not require three steps for interpolation as does tetrahedral interpolation but rather determines a set of proper sample signals to be used for interpolation and the interpolation coefficients at the same time.

It is still another object of the present invention to provide a general method to solve a convex inclusion problem which determines not only if a given signal is enclosed by a convex hull but also determines the coefficients necessary to express the signal as a convex combination of the vertices of the convex hull.

The above objects can be accomplished by a convex interpolation method and apparatus that, in the source space, selects k points close to the given point being interpolated that produce a convex hull or volume enclosing the given point. These surrounding points are used to determine interpolation weights which are applied to the corresponding points in the target space to obtain the target point in the target space.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is a multi-dimensional interpolation, called the convex interpolation, for color calibration. The convex interpolation is a smooth mapping from a n-dimensional convex hull to a m-dimensional convex hull.

Figure 4:
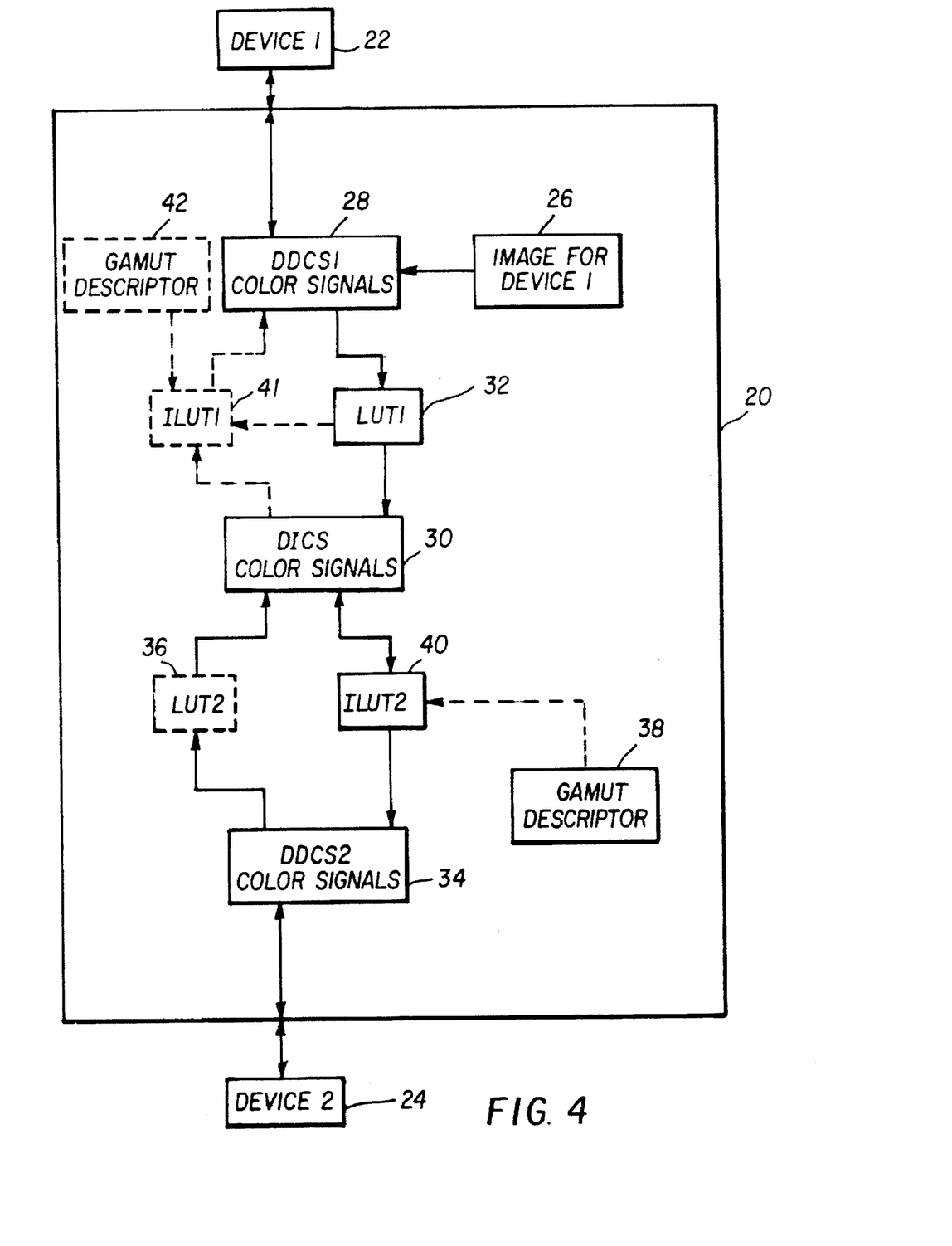
FIG. 4 illustrates the hardware components of the present invention.

As illustrated in FIG. 4, the present invention includes a computer, such as a Sun Workstation or Apple Macintosh, and two output devices 22 and 24 which can be printers or CRTs or film writers. Stored in the computer is an image 26, that is, the color signals which are used to create the image on the first device 22. The color signals for this image are color signals in the first device dependent color space 12. The present invention is designed to allow such an image to be converted into device dependent color space signals for the second device 24. In this process the color signals 28 for first device 22 are converted into device independent color space color signals 30 using a conventional forward interpolation and a look-up table 32 for the first device 22. The color signals 30 of the device independent color space can be converted into device dependent color signals 34 for the second device 24 with the look-up table 36, normally used to convert color signals 34 for device 2 into the independent color signals 30, by using backward interpolation. This is a very time consuming operation. Instead a mapping method is performed using the look-up table 36 and a gamut descriptor 38 for the second device 24 to create an inverse look-up table 40 as described in the related application previously mentioned. This inverse look-up table can then be used to rapidly convert the color signals 30 into the color signals 34. The convex interpolation and convex inclusion determination invention described herein is used to determine the entries in the inverse look-up table and then can be used to convert the color signals. Of course the same approach can be taken to create an ILUT1 (41) from a gamut descriptor 42 and the LUT1 (32), so that ILUT1 can be used to convert color signals 34 in DDCS2 into color signals 28 in DDCS1 for device 22.

Figure 5:
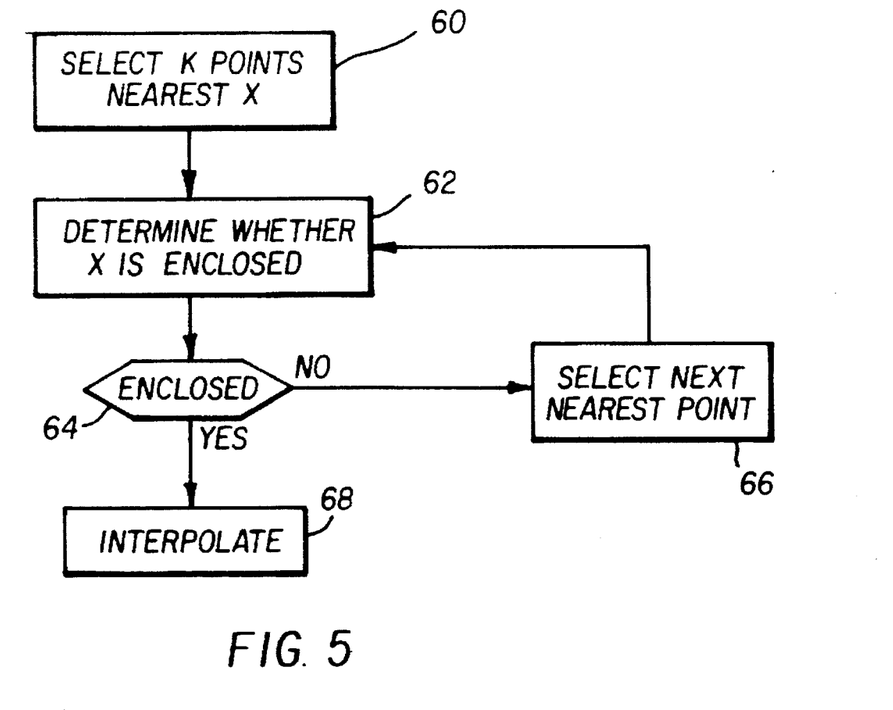
FIG. 5 depicts the general steps of the present invention.

FIG. 5 illustrates the general procedure used by the present invention to perform the interpolation mentioned above. The first step 60 is to select k points which are nearest the point x to be interpolated where $k \geq 4$ since four points is the minimum necessary to form a convex hull which encloses a point in a three dimensional space. The system then determines 62 whether the point x is enclosed by the k points. This operation will be described in more detail with respect to FIGS. 6 and 7. As the step 62 is performed the coefficients necessary to perform the interpolation are also determined. If the point is not enclosed by the set of points selected, the next closest point is added to the set and, then the convex inclusion determination is performed again. The determination of the nearest points in both step 60 and 66 is performed using a conventional distance formula such as the square root of the sum of the squares. If the point is enclosed by the set of points selected, the present invention performs the interpolation 68 in accordance with equations 6 and 7 set forth below.

Let us consider the following general interpolation problem. Let $X=\{x_1, x_2, \ldots, x_s\}$ be a set of irregularly distributed points in a first n-dimensional vector space $R^n\{s>n\}$, such as a device independent color space, and $Y=\{y_1, y_2, \ldots, y_s\}$ be the set of the corresponding irregularly distributed points in a m-dimensional vector space $R^m$, such as a device dependent color space. Given a point $x \in R^n$ where $\epsilon$ means within the set, we want to find its corresponding point $y \in R^m$ by interpolation.

Let $X_1=\{x_1, x_2, \ldots, x_k\}$ be a subset of X. The convex hull formed by:

$$CH(X_1) = \left\{ x | x = \sum_{i=1}^{k} w_i x_i, \sum_{i=1}^{k} w_i = 1, w_1, \ldots, w_k \geq 0 \right\} \quad (5)$$

The points in $X_1$ are close, but may not be the closest, to x. Let $Y_1=\{y_1, y_2, \ldots, y_k\}$ be the set of the corresponding points of $x_1, x_2, \ldots, x_k$. The convex interpolation formula is given by:

$$y = f(x) = \sum_{i=1}^{k} w_i y_i, \; k > n, \quad (6)$$

where the coefficients $w_1, w_2, \ldots, w_k$ satisfy:

$$x = \sum_{i=1}^{k} w_i x_i, \; \sum_{i=1}^{k} w_i = 1, \; w_1, \ldots, w_k \geq 0. \quad (7)$$

Convex interpolation has a number of promising properties. It requires that the convex hull of the points used to interpolate x enclose x, as implied by equation (7). This is of fundamental importance in concept since it makes a clear distinction between interpolation and extrapolation. The interpolation formula given by equation (6) satisfies the boundary conditions:

$$f(x_i) = y_i, \text{ for } x_i \in X_1 \quad (8)$$

Unlike the distance-based schemes, it has no bias on region. It can be seen from equations (6) and (7) that when x moves smoothly within the convex hull $CH(X_1)$, the corresponding point y also moves smoothly in the convex hull $CH(Y_1)$. In any case, the interpolated point y cannot move out of the convex hull $CH(Y_1)$. This ensures good performance in the worst case.

The convex interpolation scheme described above does not specify the number of points used for interpolation, nor does it specify how to select these points. It only requires that the convex hull of the points used for interpolating a point x enclose x. For the best performance, however, points used for interpolation should be chosen to be as close as possible to the given point. The following procedure may be used to find these points.

1) Let $Z = \{x_1, x_2, \ldots, x_{n+1}\}$ be the n+1 points closest to x in X;
2) While $(x \notin CH(Z))$ {
   2.1) find the closest point x' to x in X−Z;
   2.2) let $Z = \{x'\} \cup Z$;
3) Find k coefficients $w_1, w_2, \ldots, w_k$ satisfying equation (7), where k is the number of elements in Z.
4) Compute y for x by equation (6).

To perform the convex interpolation scheme, we need to solve the following convex inclusion problem: Given a point x, and a convex hull $CH(x_1, x_2, \ldots, x_k)$ in $R^n$, determine if $x \in CH(x_1, x_2, \ldots, x_k)$; if so, find k coefficients $w_1, w_2, \ldots, w_k$ satisfying equation (7).

The first part of this problem can be solved by the conventional "gift-wrapping" or the "beneath-beyond" method, or a simpler method proposed by Kallay, Convex hull made easy, Information Processing Letters, vol. 22, 1986, 161. However, these methods cannot solve the second part of the problem. In what follows, we present a simple method to solve the entire convex inclusion problem.

We solve the above problem by using modified conventional linear programming techniques. Linear programming is a general method used to solve the problem of minimizing or maximizing a linear objective function subject to a set of linear constraints. The convex inclusion problem is not directly related to linear programming since there is no objective function involved.- However, if a number of artificial variables are introduced and an objective function based on these variables is constructed, the convex inclusion problem can be transformed into a linear programming problem. The procedure is given below:

1) Add $x_{k+1} = (1, 0, \ldots 0)^T, \ldots, x_{k+d} = (0, 0, \ldots 1)^T$ to $x_1, x_2, \ldots, x_k$ where $x_1, x_2, \ldots, x_k$ are the candidates for forming a convex hull enclosing point x. This step adds unit vectors to the list of points. For example if the space in which x is found is RGB space, the vectors or points (1,0,0), (0,1,0) and (0,0,1) are added to the list of points.

2) Solve the following linear programming problem:

$$\text{Minimize} \sum_{i=n+1}^{k+n} w_i \quad (9)$$

subject to $$\sum_{i=1}^{k+n} w_i x_i = x, \; \sum_{i=1}^{k+n} w_i = 1, \; w_1, \ldots, w_{k+n} \geq 0 \quad (10)$$

where the objective function is an artificially created objective function.

3) When the linear programming procedure stops, $$\text{if Minimize} \sum_{i=k+1}^{k+n} w_i > 0,$$

we conclude $x \notin CH(x_1, \ldots, x_k)$, otherwise, we conclude $x \in CH(x_1, \ldots, x_k)$ and in this case, it returns k coefficients $w_1, \ldots, w_k$ satisfying equation (7). Due to the nature of linear programming, the number N of non-zero coefficients among $w_1, w_2, \ldots, w_k$ cannot be larger than n+1. If N=1 (assume $w_i=1$), then $x = x_i$; if N=2 (assume $w_i, w_j > 0$), then x lies in the line defined by $x_i$ and $x_j$; and if N=n+1 (assume $w_1, w_2, \ldots, w_{n+1} > 0$), then x is enclosed by the convex hull of $x_1, x_2, \ldots, x_{n+1}$. Note that n+1 points are the minimum number of points required to form a solid convex hull in $R^d$.

This procedure has a number of promising properties. First, it is applicable to any finite dimensional case. Secondly, it is easy to implement. Thirdly, it is efficient since algorithms with the expected linear time complexity are available for solving linear programming problems.

Figure 6:
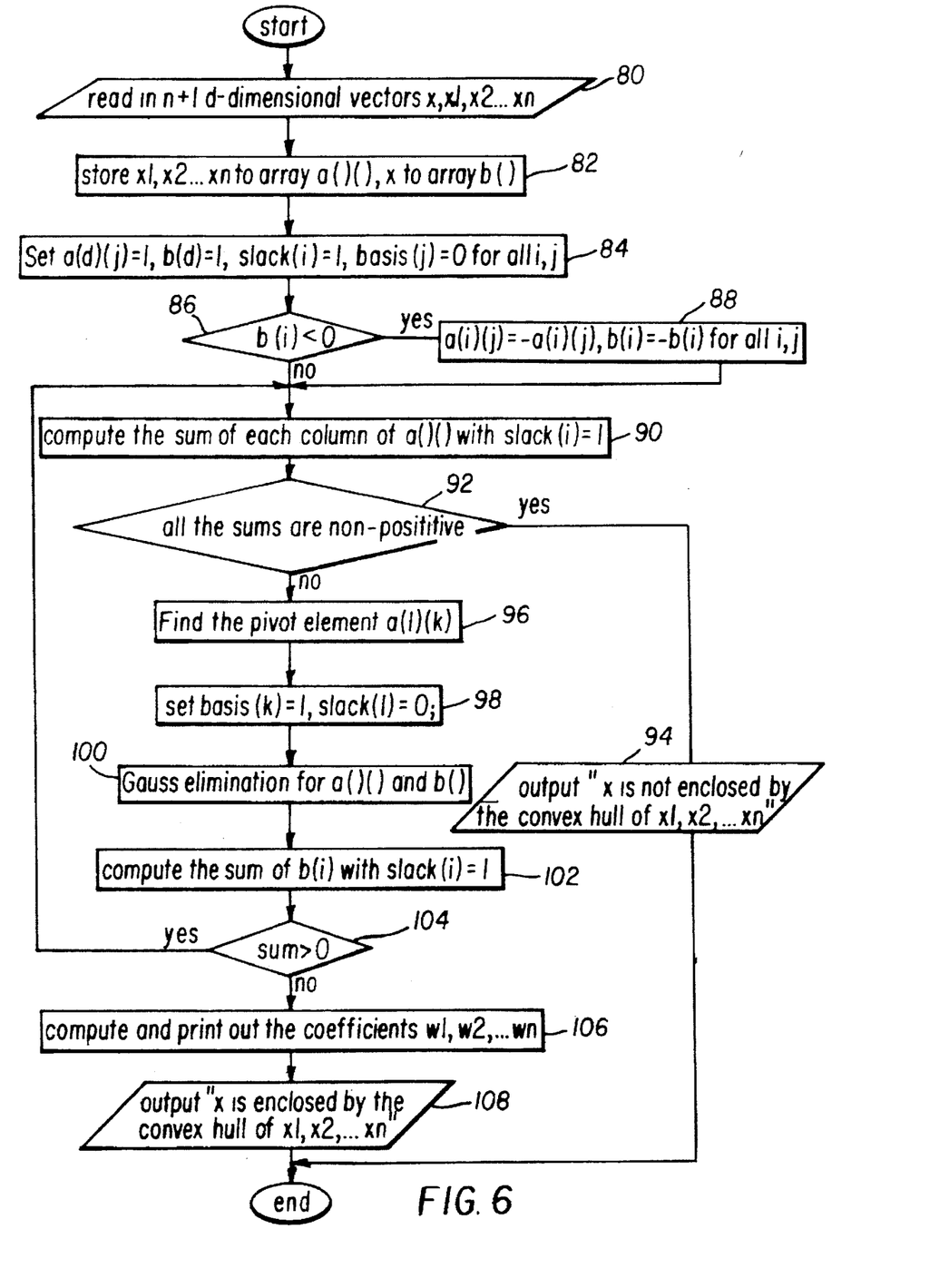
FIGS. 6 and 7 depict the method of determining whether a point is enclosed by a convex hull and determining the interpolation coefficients.
Figure 7:
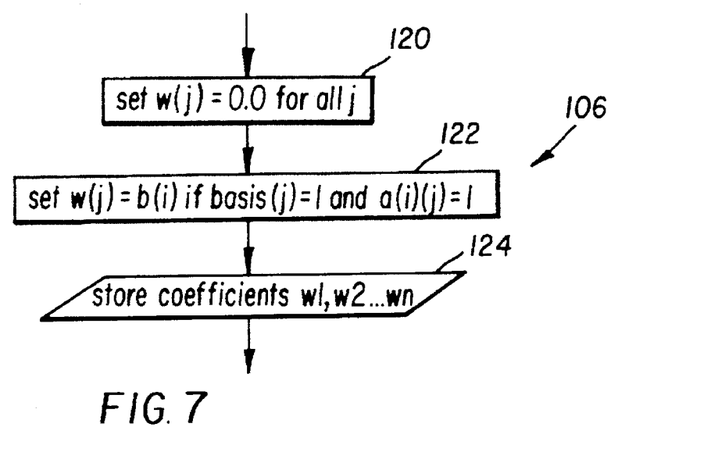

The above discussed procedure is illustrated in flowchart form in FIGS. 6 and 7. The first step 80 is to read in the points or vectors to be processed and store 82 the vectors in an array. The system then, in the next step 84, stores initial values in various work arrays. The system then tests 86 the b array to determine if it contains negative components and, if so, resets 88 the array contents. The system then enters a loop in which the first step 90 is to compute the sum of each column with the contents of the slack array. If all the sums are non-positive 92, the system outputs 94 a message indicating that the x is not enclosed by the convex hull of the set of vectors read in. Otherwise the system finds 96 the pivot element and then sets the values of the basis and slack array. The system then performs 100 a conventional gausiam elimination for the arrays and computes 102 the sum. The system then determines 104 whether the sum is greater than zero. If yes the system returns for another loop. If not the coefficients for the interpolation are computed 106 and a message indicating enclosure is output 108.

The computing step 106 of FIG. 6 is illustrated in FIG. 7. The weight array is set 120 to zero and then the contents of the b array are loaded 122 into the weights array if the basis and the array are equal to one. The coefficients are then stored 124 for the interpolation operation.

The convex interpolation given by equations (6) and (7) is a very general interpolation method. The linear programming procedure for solving the convex inclusion problem described above is only one way to implement the convex interpolation.

The main features of the convex interpolation are now summarized below. It is a smooth mapping from a n-dimensional convex hull to a m-dimensional convex hull where n and m can be any positive integers and they do not have to be equal. It does not require that the sample points used for interpolation be lattice points in both spaces. It makes a clear distinction between interpolation and extrapolation by requiring that the convex hull of the points used to interpolate a point x enclose x. This is superior to the distance-based point selection strategy because sometimes, the convex hull of k points closest to the given point x may not enclose x and in this case, an out-of-convex-hull point in the source space could be improperly mapped into an inside-convex-hull point in the target space. The convex interpolation is not restricted to using only n+1 points in a n-dimensional source space for interpolation. More than n+1 points can be used for interpolation as long as the convex hull of these points encloses the given point x and the interpolation coefficients satisfying equation (7) can be determined by using whatever method is appropriate. Using more than n+1 points for interpolation can improve the robustness of the interpolation.

To demonstrate the usefulness of the present invention, we now give an example to explain how to use the present invention, to build up a system to colorimetrically reproduce a photographic print on a digit thermal printer via a scanner.

Color calibration is a process used to establish relationships between different color spaces, so that colors can be reproduced on difference devices in a desired manner. Different color spaces are used for different devices to store color information. Commonly, RGB color space is used for scanners and CRTs, and CMY(K) color space is used for printers. Both RGB and CMY(K) are device-dependent color spaces. To reproduce a color image generated from one device on another device, a device-independent color space, such as CIEXYZ or CIEL*a*b* is introduced, serving as a bridge to link different device-dependent color spaces. The relationship between a device-dependent color space and a device-independent color space may be established by a transfer matrix for scanners and CRTs, or by interpolation using LUTs for color printers.

Figure 8:
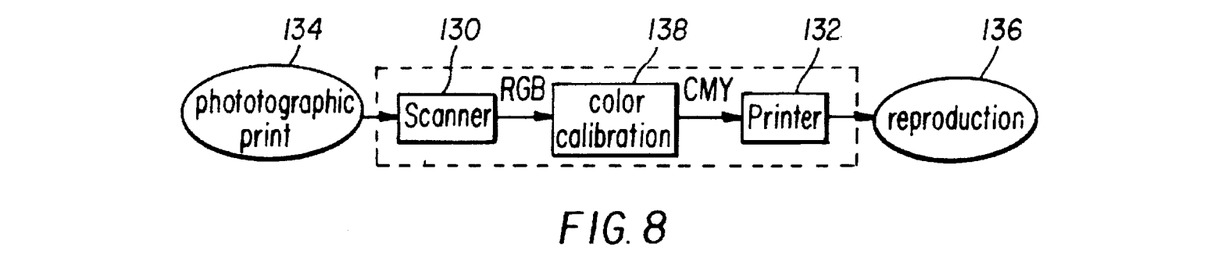
FIG. 8 illustrates a calibration process from a scanner to a printer.

FIG. 8 illustrates a color reproduction system which consists of a digital color scanner 130, such as Perkin-Elmer PDS 1010G, and a thermal color printer 132, such as a Kodak XL7700 printer. The input to the system is a photographic print 134. The output of the system is reproduction 136 of the print. A Sun Workstation computer 138 is used for the conversion calibration processing. The goal is to make the reproduction colorimetrically match the original.

The first step in calibration is to calibrate the scanner. The objective is to derive a transfer matrix which describes the relationship between the scanner RGB color space and the CIEXYZ color space. To do this a set of 64 Munsell test color patches is first scanned by the Perkins-Elmer PDS 1010G scanner 130. The spectral reflectance $\beta(\lambda)$ of each color patch is measured by a Photo Research PC-703 spectroradiometer at 31 equally-spaced wavelengths $\lambda_1, \lambda_2, \ldots \lambda_{31}$ from 400 nm to 700 nm. The CIEXYZ tristimulus values for each color patch are calculated by:

$$X = \frac{1}{K} \sum_{i=1}^{31} S(\lambda_i)\beta(\lambda_i)\bar{x}(\lambda_i)$$

$$Y = \frac{1}{K} \sum_{i=1}^{31} S(\lambda_i)\beta(\lambda_i)\bar{y}(\lambda_i)$$

$$Z = \frac{1}{K} \sum_{i=1}^{31} S(\lambda_i)\beta(\lambda_i)\bar{z}(\lambda_i)$$

(11)

-continued $$K = \sum_{i=1}^{31} S(\lambda_i)\bar{y}(\lambda_i)$$

where $s(\lambda)$ is the spectral power distribution of the CIE standard illuminant $D_{65}$, and $\bar{x}(\lambda), \bar{y}(\lambda), \bar{z}(\lambda)$ are the CIE standard color matching functions. Assume that the relationship between the scanner RGB and CIEXYZ is linear:

$$\begin{bmatrix} X \\ Y \\ Z \end{bmatrix} = M \begin{bmatrix} R \\ G \\ B \end{bmatrix} \quad (12)$$

where M is a 3×3 matrix. Let $R_i, G_i, B_i$ and $X_i, Y_i, Z_i$ (i=1, 2, ..., 64) be the scanner RGB values and the tristimulus values for the 64 color patches. They are normalized so that $0 \leq R_i, G_i, B_i \leq 1$, and $0 \leq Y \leq 1$. Substituting these data into equation (11) yields:

$$\begin{bmatrix} X_1 \ldots X_{64} \\ Y_1 \ldots Y_{64} \\ Z_1 \ldots Z_{64} \end{bmatrix} = M \begin{bmatrix} R_1 \ldots R_{64} \\ G_1 \ldots G_{64} \\ B_1 \ldots B_{64} \end{bmatrix} \quad (13)$$

or $$U = MV. \quad (14)$$

The least-square solution to equation (13) is given by:

$$M = (UV^T)(VV^T)^{-1}. \quad (15)$$

At this point, the correlation between the scanner RGB and the CIEXYZ is established by the transfer matrix M.

The second step is to calibrate the printer. The objective is to find a LUT from the printer CMY color space to the CIEL*a*b* color space. Kodak XL7700 printer 132 is a thermal printer with a spatial resolution of 200 DPI, and a color resolution of 24 bits, 8 bits for each of the C(cyan), M(magenta), and Y(yellow) channels. A set of 512 color patches is produced from the printer. The code values of the color patches are chosen to be evenly spaced, covering a full range of the CMY space. The spectral reflectance of each color patch is measured by the same Photo Research PC-703 spectroradiometer, and transformed to the CIEXYZ tristimulus values by equation (11). The tristimulus values are then converted to CIEL*a*b* by:

$$L^*=116(Y/Y_0)^{1/3}-16 \ a^*=500[(X/X_0)^{1/3}-(Y/Y_0)^{1/3}] b^*=200[(Y/Y_0)^{1/3}-(Z/Z_0)^{1/3}] \quad (16)$$

At this point, a LUT of 512 points from the printer CMY color space to the CIEL*a*b* color space is obtained.

Once a LUT is given, mapping from the CIEL*a*b* color space to the printer CMY color space can be done by the convex interpolation method.

Figure 9:
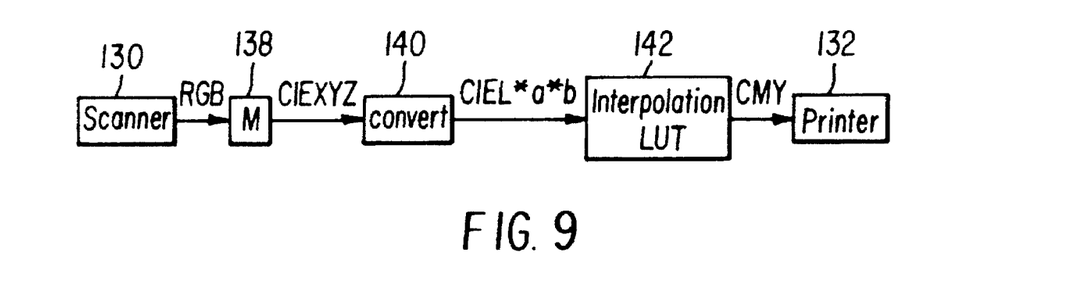
FIG. 9 depicts a transfer operation from scanner RGB code values to CMY code values.

Having calibrated the scanner and the printer, we are now ready to calibrate the system. As depicted in FIG. 9, the original photographic prints are scanned by the scanner 130. The scanner RGB signals are transferred to the CIEXYZ tristimulus values using the matrix M given by equation (12). The CIEXYZ tristimulus values are then converted 140 to the CIEL*a*b* values by equation (16). Transformation from CIEL*a*b* to the printer CMY is done by interpolation 142 as follows.

If a given color is in the printer's gamut, as determined in accordance with the procedure described in the related application, the convex interpolation is used to compute its corresponding CMY values based on the LUT. For simplicity, the convex interpolation scheme may be implemented as follows: The $8^3$ lattice points divide the CMY space into $7^3$ cubes. Each cube in the CMY space corresponds to a convex hull of 8 points in the CIEL*a*b* space. To interpolate a point x in CIEL*a*b*, we use the approach previously described to find a convex hull from the $7^3$ convex hulls which encloses x (in this case, k=8 and n=m=3). Interpolation at x is then done by using not more than 4 points selected from the 8 points of the convex hull. If the given color is out of the printer's gamut, it is mapped to a gamut boundary point without changing its hue and lightness as described in the related application. This gamut clipping strategy works well for images with a small percentage of out-of-gamut colors scattered over the image. Other gamut mapping strategies can be used.

The problem with the calibration scheme described in FIG. 9 is the efficiency. Transformation from CIEL*a*b* to CMY is a slow process because of the cost to determine if a color is in gamut, the cost to map an out-of-gamut color to an in-gamut color, and the cost to search for a proper set of points to interpolate an in-gamut color. Experiments show that this scheme requires a long time to calibrate an image on a personal workstation.

The efficiency of calibration as illustrated in FIG. 9 can be significantly improved if the LUT is replaced by an inverse look-up table (ILUT). In the ILUT, the entry points are lattice points in CIEL*a*b*. Interpolation from CIEL*a*b* to CMY can be done by the timewise inexpensive trilinear forward interpolation. The ILUT can be constructed from a LUT by using the convex interpolation in a similar way as described above. For a lattice point in CIEL*a*b* which is out of the printer's gamut, we map it to a point inside the gamut; if it is in the printer's gamut, we compute its corresponding point in CMY by convex interpolation. Since only a small percentage (15–25%) of the lattice points in the CIEL*a*b* space are inside the printer's gamut, the size of ILUT should be chosen to be much larger than the size of LUT. In our implementation, the ILUT includes 21×41×45 points, covering a gamut range from 0 to 100 for L*, −100 to 100 for a*, and −110 to 110 for b*. ConstrUction of an ILUT from a LUT can be timewise expensive, but it needs to be done only once (off-line). Once an ILUT is obtained, calibrating an image of 1024×1024 can be done in less than a minute on a personal workstation.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of converting a color signal from a device independent color space to a device dependent color space for an output device, comprising the steps of:

(a) performing a convex interpolation of the color signal in the device independent color space (x) to produce a converted color signal in the device dependent color space (y), a convex hull interpolation performed substantially by $$y = [f(x)] = \sum_{i=1}^{k} w_i y_i, k > n,$$

where n=dimensionality of the device independent color space and includes the steps of:

(a1) determining whether a set of color signals in the independent color space $(x_i)$ form a convex hull defined by a finite number of points according to $$x = \sum_{i=1}^{k} w_i x_i, \sum_{i=1}^{k} w_i = 1, w_i, \ldots, w_k \geq 0.,$$

that encloses the color signal, said finite number comprising at least four points;

(a2) selecting the points $y_i$ in the dependent color space which corresponds to the points $x_i$ in the independent color space; and (b) providing signals representative of said determination.

2. A method as recited in claim 1, including a further step of displaying the converted color signal using the output device, and wherein step (a) further comprises the steps of:

(a3) determining interpolation coefficients if the convex hull encloses the color signal; and (a4) performing a convex interpolation using the coefficients and the corresponding color signals to produce the converted color signal.

3. A method as recited in claim 2, wherein step (a1) comprises the steps of:

(i) performing a convex inclusion procedure on the set of signals; and (ii) adding a next nearest signal to the set if the convex hull does not enclose the color signal performing step (i) again.

4. A method as recited in claim 3, wherein step (i) comprises the steps of:

(A) adding unit vector signals to the set; and (B) minimizing a sum of dimensional weights subject to signal weight times the corresponding signal summing to the color signal, the sum of the dimensional weights and signal weights equaling one and the dimensional and signal weights all being greater than or equal to zero.

* * * * *